June 28, 1949.    R. A. HAMPSHIRE    2,474,245
NULL MEASURING BRIDGE
Filed Sept. 14, 1944
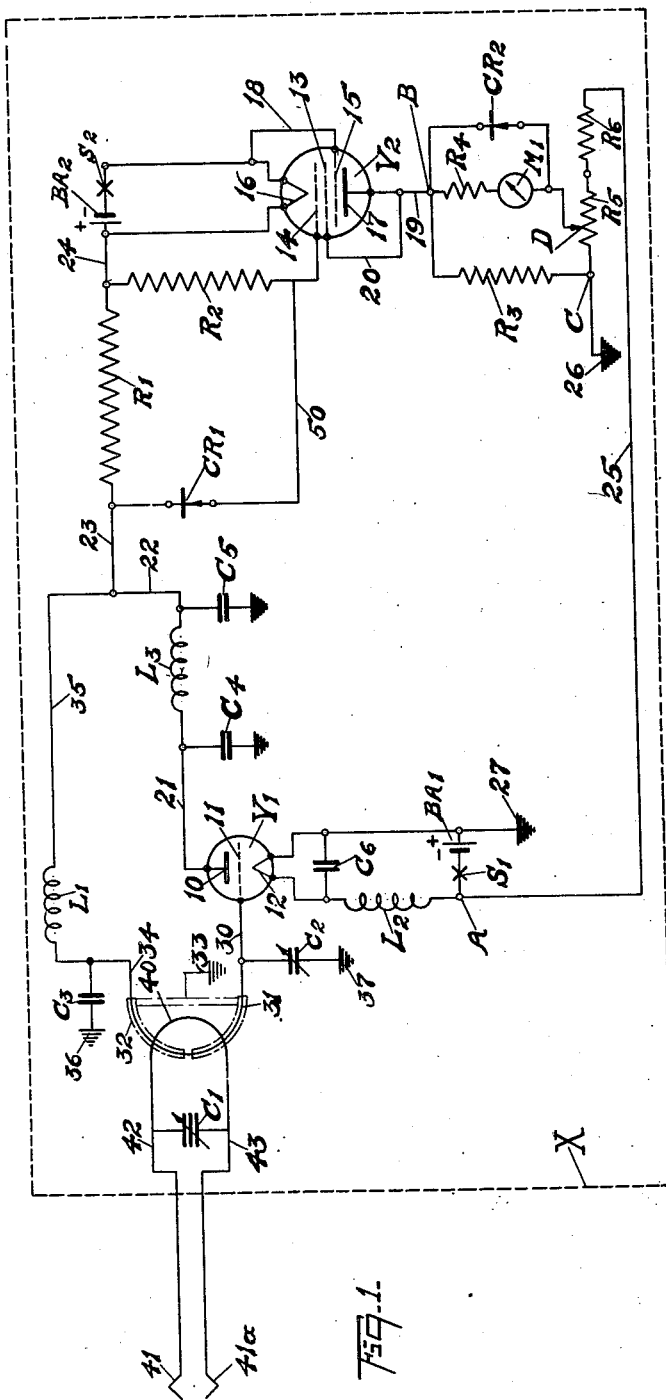
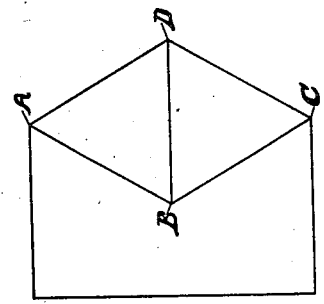
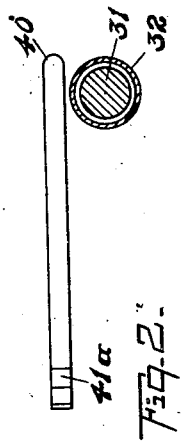
INVENTOR.
ROBERT A. HAMPSHIRE
BY
ATTORNEY Patented June 28, 1949

2,474,245

UNITED STATES PATENT OFFICE 2,474,245

NULL MEASURING BRIDGE

Robert A. Hampshire, West Caldwell, N. J., assignor to Federal Telephone and Radio Corporation, New York, N. Y., a corporation of Delaware Application September 14, 1944, Serial No. 554,104

10 Claims. (Cl. 171—95)

This invention relates to a null measuring bridge, that is to say, a means particularly suitable for determining the nodal point or points in a conductor suitably energized to develop standing waves, and is especially useful when it is necessary to cut a plurality of high frequency cables so that all will have substantially the same electrical length.

In order to be commercially practicable it is essential that a null-detector be extremely sensitive and this necessitates the use of delicate elements used in detecting, amplifying, and indicating or measuring currents induced in the null-detector circuits by the energized cable under examination. Because of the delicacy and sensitivity of the elements employed in the null-detector they are easily injured or even destroyed by accidental excess voltages which may be developed in the null-detector system. It is necessary, therefore, to provide means for protecting the sensitive elements against the action of such excess voltages, and to do this without at the same time appreciably decreasing the sensitivity of the null-detector.

The principal object of the present invention is to provide a null-detector which will be protected against injury by such accidental excess voltages as may be encountered in general use of the null-detector and which will retain its necessary extreme sensitiveness in determining with a high approach to absolute accuracy the null points or nodes in a high frequency cable energized to develop standing waves.

A further object of the invention is to provide a relatively simple, compact and durable null measuring bridge which can be adjusted to and maintained in operative condition with minimum effort.

With these principal objects in view and some others which will be apparent to those skilled in the art from the detailed description hereinafter given of one embodiment of the invention, the invention comprises a null-detector whose circuit system is an adaptation of the well-known Wheatstone bridge-circuit system, with the indicating or metering instrument in the normally neutral or bridging branch of the bridge-circuit system, in combination with a probe device, including a tuned probe-circuit system, arranged to be energized by the cable or the like under test and by magnetic induction to energize appropriate instrumentalities in an arm of the null-detector bridge-circuit system and thereby unbalance the system and operate the indicator or meter. This action indicates that the probe is not at a nodal point of a standing wave in the energized conductor under test, but by shifting the probe along the conductor a point will be found where no transmission of energy from the conductor to the null-detector will occur and the bridge-circuit system will remain in balance, the indicator or meter showing a null reading, whereby the location of the probe device on the conductor under test will determine the nodal point of the standing wave in it.

While a null-detector may be made adjustable, so as to be employed at a plurality of frequencies, in normal operation, the high frequency for which a conductor or cable is to be used may be predetermined and a null-detector operative only at that predetermined frequency may be employed with a consequent simplification of the null-detector circuit system.

An apparatus embodying the invention in its simplified form will now be described in connection with the accompanying drawings, in which:

Fig. 1 is a diagrammatic view of the null-detector.

Fig. 2 is a diagrammatic detail side view, partly in section, illustrating the location of the probe-circuit in inductive relation to the circuit system of the null-detector, and showing the electrostatic shield and its ground.

Fig. 3 is an explanatory diagram of a Wheatstone bridge-circuit system hereinafter referred to in explaining the invention.

Referring, first, to Fig. 3, it will be seen that it merely indicates the conductive branches of a well-known Wheatstone bridge-circuit system, certain junctions of these branches being marked with the letters A, B, C, and D respectively.

As is well-known to those skilled in the art, if the ratio of the resistances of the arms A—B, B—C is equal to the ratio of the resistances of the arms A—D, D—C, no current will flow in the bridge-branch B—D when the bridge-circuit system is energized and current is flowing in the arms. In other words, the points B and D are at equal potential when the bridge-circuit system is balanced. If, however, the resistance in the arm A—B be changed, the bridge-circuit system will be unbalanced and a current will flow across the bridge-branch B—D.

In the description hereinafter of the apparatus embodying the invention, the points in the apparatus corresponding in a general way to the points A, B, C, and D of the diagram Fig. 3 will be marked. The equivalent current paths of the apparatus corresponding to the arms A—B, B—C, A—D and D—C, may be referred to generally as the conductive arms, the current path of the apparatus corresponding to the bridge-conductor B—D will be designated the bridge-branch, and the current path in the apparatus corresponding to the conductor extending from A directly to C in Fig. 3 will be designated generally the return path C—A.

In the apparatus embodying the invention the indicating device is most advantageously a very sensitive direct current meter, which as before stated is included in the bridge-branch B—D with some accompanying protective elements or instrumentalities, as hereinafter pointed out. Also, suitable detecting and amplifying devices cooperatively associated with each other and with their proper circuit connections are inserted in the arm A—B. The resistances of the remaining arms, B—C, A—D and C—D, are made such that, under normal conditions, there is no current through the bridge-branch B—D and the indicating device or meter shows a null indication.

In addition, the probe-circuit is arranged to have a portion in inductive relation to the grid circuit of the detector. If the probe circuit is energized from a conductor or cable, it correspondingly energizes the detector which in turn affects the amplifier and results in a change of the electron flow in the amplifier plate circuit. This is equivalent to a variation in the resistance of the arm A—B, thereby causing an unbalancing of the bridge-circuit system, with a flow of current over the bridge-branch B—D of the system and an actuation of the indicator.

With this general explanation of the invention, the details of a practical embodiment of the invention, illustrated diagrammatically in Fig. 1, will now be described.

In this drawing, $V_1$ is a vacuum tube detector having a plate 10, a grid 11 and a filament 12, these elements constituting what is termed a triode. The filament is included in a battery circuit energized by a battery $BA_1$, the circuit including a high frequency choke coil $L_a$ and being bridged by a fixed condenser $C_6$. A suitable switch $S_1$ is provided for opening and closing the battery connection to the circuit.

The positive pole of the battery is grounded at 27, on a metallic base plate of the apparatus, whose outline is indicated by the dash lines X, Fig. 1.

At $V_2$ is indicated a vacuum tube amplifier, in this case a pentode, having in effect, three grids, that is to say, a normal or control grid 14, a screen grid 13, and a suppressor grid 15, respectively. Also the pentode has the usual cathode, in this case shown as a filament 16, and has a plate indicated at 17.

The filament 16 is included in a battery circuit energized by a battery $BA_2$, the negative side of this battery being in conductive connection with the suppressor grid 15 over a conductor 18.

The amplifier plate 17 is connected by a conductor 19, to the bridge-branch of the bridge-circuit system at the point B. The screen grid 13 is connected to the conductor 19 by a branch-conductor 20.

The detector plate 10 is in conductive connection with the positive pole of amplifier battery $BA_2$ over a conductive path, comprising conductor 21, a high frequency choke coil $L_o$, conductors 22 and 23, resistance $R_1$ and conductor 24. The amplifier control grid 14 is conductively connected to conductor 24 through a resistance $R_2$.

The choke coil $L_o$ is connected at each end to a condenser, these condensers $C_4$ and $C_5$ being grounded on the base plate X of the apparatus.

The closed circuit which includes the inductance $L_o$, the two condensers $C_4$ and $C_5$ and their ground connections constitutes a loop circuit which may be constructed or adjusted to have a natural frequency equal to or a multiple of that of the high frequency normally employed in developing standing waves in the cable or conductor under examination, thereby forming a barrier to the passage of any alternating currents, and particularly to any having the frequency which is natural to the loop.

It will be noted that the detector plate 10 is in conductive connection with the suppressor grid 15 of the amplifier, over the conductor 21, the inductance $L_o$, the conductors 22 and 23, the resistor $R_1$, the conductor 24, the amplifier battery $BA_2$, through a part of the said battery circuit, to and over the branch 18. Also the detector plate 10 is in conductive connection with the control grid 14 through part of this circuit and the resistor $R_2$.

The negative pole of the detector filament battery $BA_1$ is equivalent to the point A in the diagram Fig. 3. It is connected by a conductor 25 to one end of a fixed resistance $R_6$ whose other end is connected to one end of what may be called a rheostatic resistance $R_5$, along which may be adjusted one end of the bridge-branch in which is included the indicating device, which, most advantageously is a direct current meter, indicated at $M_1$. The neutral position of the adjustable end of this bridge-branch may be considered the equivalent of the point D in the diagram Fig. 3. The other end of the bridge-branch is the point B to which the amplifier plate 17 is connected by the conductor 19, heretofore referred to.

In the present example there is provided a protective branch, shunt or by-pass around the meter $M_1$ which includes a resistor having a negative coefficient of resistance, such as a selenium rectifier, as indicated at $CR_2$, and in this case a resistor $R_4$ is put in series with the meter to somewhat increase the impedance of the meter and thereby maintain a proper normal potential drop over the selenium rectifier. At normal voltages, the selenium rectifier has a very high resistance, but with high voltages the resistance of the selenium rectifier falls rapidly and thereby protects the meter by allowing any abnormal current to flow over the by-pass or shunt branch in which the selenium rectifier is placed.

A resistor $R_3$ is connected at one end to the bridge-branch, at point B, and at the other end to an end of the resistor $R_5$. The junction point of the connection of these two resistors is equivalent to the point C on the diagram, Fig. 3, and is so marked in Fig. 1. Hence the branch containing the resistor $R_3$ is the arm B—C of the bridge circuit system, and the branch containing that part of the rheostatic resistance to the left, Fig. 1 of the adjusted null position of point D is the equivalent of the arm D—C of the bridge-circuit system, Fig. 3.

The point C is grounded on the base plate of the apparatus, as indicated at 26, and the path from point C to point A at the negative pole of the detector filament battery $BA_1$, which includes the ground connection 26, the base plate X, the ground connection 27, and the battery $BA_1$ may be called the return path equivalent to the path A—C in Fig. 3.

The equivalent of the arm A—D in Fig. 3 is the path from the negative pole of the detector filament battery $BA_1$, over the conductor 25, and includes the fixed resistor $R_5$ and so much of the resistor $R_5$ as lies to the right of the adjustable point D, Fig. 1, when the bridge-circuit system is in balance under normal conditions.

An important feature of the invention is that the grid 11 of the detector triode forms the terminal of a conductive path leading to its plate circuit, for example at the junction point of conductors 22 and 23, this path including a conductor 30, a curved portion 31, which for purposes of identification may be called an inductive secondary and which is electrostatically shielded by a split metallic shield 32, grounded at 33, a conductor 34, a high frequency choke coil $L_1$ and a conductor 35.

The conductor 34 is connected to ground at 36, through a fixed condenser $C_3$, and the conductor 30 is connected to ground at 37 through a condenser $C_2$ which in the best embodiment of the invention is a variable condenser, serving to tune the circuit, which includes the conductors 30, 31, 34, the two condensers $C_2$ and $C_3$ and the ground connection, to resonate at the high frequency of the energy in the cable under test.

For the purpose of energizing the grid branch containing the curved portion 31, which serves as an inductive secondary, a probe-circuit is provided, this comprising a curved portion 40 which is intended to be brought into magnetically inductive relation with the curved portion 31 of the grid branch and to thereby serve as an inductive primary. The probe-circuit also comprises a pair of contact devices 41, 41a connected by conductors 42, 43, to the respective ends of the curved portion 40, these conductors being bridged by a variable condenser $C_1$ arranged in parallel with the curved portion 40 and serving to tune the probe-circuit to synchronism with the high frequency energy in the cable under test.

The said curved portion 40 of the probe-circuit may be brought into magnetically inductive relation with the curved portion 31 of the grid branch in any suitable way, as for example by placing it above the curved portion 31, as indicated in Fig. 2, and may be adjusted lengthwise to vary the extent of coupling of the two curved portions, and then may be fixed in the adjusted relationship by any suitable means (not shown).

In general, the coupling between the curved portions 40 and 31 is advantageously kept loose, to reduce the effects of mutual induction.

While it is satisfactory in some uses of the invention to omit the resistor $R_2$ and connect the control grid to the conductor 23, by a simple connection, in the best embodiment of the invention it is highly advantageous to employ a selenium rectifier $CR_1$, in combination with the resistors $R_1$ and $R_2$, the selenium rectifier being included in a branch conductor 50 extending from conductor 23, in parallel with resistors $R_1$ and $R_2$ to grid 14.

When the current through $R_1$ is small, the voltage on the rectifier $CR_1$ is low and its resistance is very high so that the potential on grid 14 is effectively that of conductor 14, i. e. that of the positive end of resistor $R_1$. When the current through $R_1$ increases the resistance of $CR_1$ correspondingly decreases so that the potential on the control grid 14 becomes more negative. With sufficient increase of current through $R_1$, which, of course, is due to a corresponding increase in current through vacuum tube $V_1$ the decrease in resistance of the selenium rectifier $CR_1$ constitutes an effective short circuit between the grid 14 and conductor 23, and thus the voltage on control grid 14 becomes more negative, i. e. effectively it becomes that of the negative end of resistor $R_1$, as compared with what it would be without the connection through conductor 50 and selenium rectifier $CR_1$. This protects the apparatus against the danger of injury which would exist in the case of an abnormal increase of energy in the conductor 23 if the control grid 14 were connected directly to the conductor 23 by a simple conductor.

With the apparatus described, a cable to be examined at high frequency is connected and energized to impress upon one end of it the predetermined high frequency voltage so as to develop in the cable a series of standing waves.

The contacts 41 and 41a are brought in contact with the cable, and can be adjusted back and forth lengthwise of the cable, a test being made at each adjusted position. Assuming that at the first position of the adjustment the contacts 41 and 41a are not at a nodal point of the standing waves in the cable, a high frequency current will flow in the probe-circuit, which may be tuned to resonance by adjusting the variable condenser $C_1$. The curved portion 40 of the probe-circuit, being in inductive relation to the curved portion 31 of the detector grid branch, induces a high frequency voltage in the grid branch, and thereby impresses a voltage on the detector grid 11, the maximum amplitude of this voltage being controlled by the adjustment of the variable condenser $C_2$. The signal thereby received on the detector grid 11, affects the flow of electrons from the detector filament to its plate, in the well-known manner, so as to correspondingly alter the plate current from the detector and this effect is the equivalent of a change of resistance of the arm A—B of the bridge-circuit system which results in unbalancing the bridge-circuit system so that a current flows across the bridge branch B—D and actuates the meter. This indicates that the probe-contacts are not at the nodal point of a standing wave. Thereupon they are moved to another position and another test made until a position is reached where the indicator or meter is not actuated but remains in its zero or null position. This indicates that the probe-contacts 41, 41a are properly positioned at a nodal point of a standing wave in the cable or conductor being tested. Where a meter is used as the indicating means, the value of current shown by the meter aids in determining the error in the position of the probe, and the extent to which it must be shifted to reach the nodal position.

It is to be noted that the detector grid 11 takes its bias from the plate circuit of the detector, over the conductor 35, inductance $L_1$, conductors 34, 31 and 30, this grid bias path being conductive for direct current but blocked against alternating currents by the high frequency choke coil $L_1$ and the loop circuit formed by the high frequency choke coil $L_2$, condensers $C_4$ and $C_5$ and their ground connections. Hence, any change in the voltage on the detector plate 10 will correspondingly alter the voltage on the grid 11, for example, if plate 10 becomes more negative, as by an increase in current through resistor $R_1$, this will cause a decreased flow of electrons to the plate 10. This action, which is degenerative in nature, aids in protecting the apparatus against unusually strong signals, such as might result if the probe-contacts 41 and 41a made contact with the cable under test at a point far removed from a nodal point of a standing wave in such cable.

Also, the control grid 14 of the amplifier tube $V_2$ is biased from the detector plate circuit because of the connection of $CR_1$ and $R_2$ across the resistor $R_1$ so that an increase in plate current of the detector tube $V_1$ causes a corresponding decrease in voltage on the amplifier tube control grid 14 with a consequent decrease in the flow of electrons from the filament to the plate of the amplifier tube.

The action of the circuit is, therefore, such as to provide an extremely sensitive indication of signal changes when the signal is small, and a very insensitive indication when the signal is large, this latter insensitive response being desirable since it affords overload protection to the elements $M_1$ and $V_1$. When the signal is small a slight change will result in a substantial increase of plate current in $V_1$. The change will not be sufficient, however, to materially decrease the electrical resistance of rectifiers $CR_1$ and $CR_2$. Meter $M_1$ is shunted, therefore, by a resistance (e. g. $R_3$) which is high and the meter indicates the full effect of the slight signal change. Amplifier tube $V_2$ is furthermore protected by $CR_1$ from a large change in control grid voltage and its resistance to the flow of current from plate 17 to filament 16 is low; its effect as an impedance to flow of detector plate current is, therefore, correspondingly low.

When the signal is large, as a result, for instance, of a displacement of the probes far from a nodal point, the detector current tends to rise to an extent which is dangerous to meter $M_1$ and to the detector tube $V_1$. $M_1$ is protected from this action by $CR_2$, and $V_1$ is protected by the action of the amplifier tube $V_2$. This latter action results from the increase in resistance between plate 17 and filament 16 of $V_2$ which is brought about by the increased negative control grid voltage. The action is further enhanced by the connection of grid 11 of tube $V_1$ which is such as to provide a large negative bias to this tube which further protects it.

It has been found that the apparatus constructed as described is extremely sensitive and successful in locating the nodal points with a close approach to absolute accuracy, while at the same time it is well protected against excess voltages such as are occasionally encountered in actual practice.

What is claimed is:

1. In measuring apparatus of the class described, a Wheatstone bridge circuit which has four arms and two diagonals and which is adapted to be energized by an electric power source connected across one diagonal thereof to actuate indicating means connected across the other diagonal thereof to indicate the condition of balance of said bridge circuit; one of the arms of said bridge circuit including first and second vacuum tubes, each having a cathode, an anode, and a control electrode; circuit means connecting said tubes in series between the terminals forming the ends of said arm of said bridge circuit with the anode of said first tube connected to the cathode of said second tube; biasing means interposed in said last-named connection; means connecting the anode of said first tube to the control electrode of said second tube; means for impressing the signal to be measured between the cathode and control electrode of said first tube; and means providing a degenerative feedback connection between the control electrode and the anode of said first tube, whereby said tubes and indicating means are protected from the detrimental effects of large signals.

2. In measuring apparatus of the class described, a Wheatstone bridge circuit which has four arms and two diagonals and which is adapted to be energized by an electric power source connected across one diagonal thereof to actuate indicating means connected across the other diagonal thereof to indicate the condition of balance of said bridge circuit; one of the arms of said bridge circuit including first and second vacuum tubes, each having a cathode, an anode, and a control electrode; circuit means connecting said tubes in series between the terminals forming the ends of said arm of said bridge circuit with the anode of said first tube connected to the cathode of said second tube; a biasing impedance interposed in said last-named connection; degenerative feedback means connecting the anode of said first tube to the control electrode of said second tube; means for impressing the high frequency signal to be measured between the cathode and control electrode of said first tube; and high frequency filtering means conductively connecting the control electrode circuit of said first tube to its anode, whereby said apparatus is protected from the effect of signals of excessive magnitude.

3. In measuring apparatus of the class described, a Wheatstone bridge circuit which has four arms and two diagonals and which is adapted to be energized by an electric power source connected across one diagonal thereof to actuate indicating means connected across the other diagonal thereof to indicate the condition of balance of said bridge circuit; one of the arms of said bridge circuit including first and second vacuum tubes, each having a filament, an anode, and a control grid; two sources of D. C. power, each connected across the filament of one of said tubes to heat said filaments; circuit means connecting said tubes in series between the terminals forming the ends of said arm of said bridge circuit with the anode of said first tube connected to the positive side of the D. C. filament power source of said second tube; biasing means interposed in said last-named connection; means connecting the anode of said first tube to the control grid of said second tube; means for impressing the signal to be measured between the filament and control grid of said first tube; and means connecting the negative side of the D. C. filament power source of said first tube to one terminal of said bridge arm and the positive side of said D. C. filament power source to the diagonally opposite terminal of said bridge circuit, whereby said bridge circuit is energized by said D. C. filament power source.

4. In measuring apparatus of the class described, a Wheatstone bridge circuit which has four arms and two diagonals and which is adapted to be energized by an electric power source connected across one diagonal thereof to actuate indicating means connected across the other diagonal thereof to indicate the condition of balance of said bridge circuit; one of the arms of said bridge circuit including first and second vacuum tubes, each having a cathode, an anode, and a control electrode; circuit means connecting said tubes in series between the terminals forming the ends of said arm of said bridge circuit with the anode of said first tube connected to the cathode of said second tube; biasing means interposed in said last-named connection; means for impressing the signal to be measured between the cathode and control electrode of said first tube; first impedance means connected to the cathode of said second tube; second impedance means having a negative coefficient of impedance connected between said first impedance means and the anode of said first tube to form a shunt across said biasing means; and means connecting the control electrode of said second tube to the junction between said first and second impedances means, whereby the negative bias on the control grid of said second tube is increased as the magnitude of the impressed signal is increased.

5. In measuring apparatus of the class described, a Wheatstone bridge circuit which has four arms and two diagonals and which is adapted to be energized by an electric power source connected across one diagonal thereof to actuate indicating means connected across the other diagonal thereof to indicate the condition of balance of said bridge circuit; one of the arms of said bridge circuit including first and second vacuum tubes, each having a cathode, an anode, and a control grid; circuit means connecting said tubes in series between the terminals forming the ends of said arm of said bridge circuit with the anode of said first tube connected to the cathode of said second tube; a biasing resistor interposed in last-named connection; means for impressing the signal to be measured between the cathode and control grid of said first tube; a resistor connected to the cathode of said second tube; a selenium rectifier connected between said resistor and the anode of said first tube thus forming a shunt across said biasing resistor; and a connection between the control grid of said second tube and the junction between said resistor and said rectifier, whereby the negative coefficient of resistance of said rectifier causes the negative bias on the control grid of said second tube to be increased as the magnitude of the impressed signal is increased.

6. In measuring apparatus of the class described, a Wheatstone bridge circuit which has four arms and two diagonals and which is adapted to be energized by an electric power source connected across one diagonal thereof to actuate indicating means connected across the other diagonal thereof to indicate the condition of balance of said bridge circuit; one of the arms of said bridge circuit including first and second vacuum tubes, each having a cathode, an anode, and a control electrode; circuit means connecting said tubes in series between the terminals forming the ends of said arm of said bridge circuit with the anode of said first tube connected to the cathode of said second tube; biasing means interposed in said last-named connection; means connecting the anode of said first tube to the control electrode of said second tube; means for impressing the signal to be measured between the cathode and control electrode of said first tube; first impedance means connected in series with said indicating means; and second impedance means having a negative coefficient of impedance means connected across the diagonal of said bridge circuit in parallel with said indicating means, whereby said indicating means is protected against the detrimental effects of large signals.

7. In measuring apparatus of the class described, a Wheatstone bridge circuit which has four arms and two diagonals and which is adapted to be energized by an electric power source connected across one diagonal thereof to actuate indicating means connected across the other diagonal thereof to indicate the condition of balance of said bridge circuit; one of the arms of said bridge circuit including first and second vacuum tubes, each having a cathode, an anode, and a control electrode; circuit means connecting said tubes in series between the terminals forming the ends of said arm of said bridge circuit with the anode of said first tube connected to the cathode of said second tube; biasing means interposed in said last-named connection; means connecting the anode of said first tube to the control electrode of said second tube; means for impressing the signal to be measured between the cathode and control electrode of said first tube; means providing a degenerative feedback connection between the control electrode and the anode of said first tube; first impedance means connected in series with said indicating means; and second impedance means having a non-linear resistance characteristic connected across the diagonal of said bridge circuit in parallel with said indicating means, whereby said tubes and indicating means are protected from the detrimental effects of large signals.

8. In measuring apparatus of the class described, a Wheatstone bridge circuit which has four arms and two diagonals and which is adapted to be energized by an electric power source connected across one diagonal thereof to actuate indicating means connected across the other diagonal thereof to indicate the condition of balance of said bridge circuit; one of the arms of said bridge circuit including first and second vacuum tubes, each having a cathode, an anode, and a control electrode; circuit means connecting said tubes in series between the terminals forming the ends of said arm of said bridge circuit with the anode of said first tube connected to the cathode of said second tube; a biasing impedance interposed in said last-named connection; means connecting the anode of said first tube to the control electrode of said second tube; means for impressing the high frequency signal to be measured between the cathode and control electrode of said first tube; high frequency filtering means conductively connecting the control electrode circuit of said first tube to its anode; a current meter connected across one diagonal of said bridge as an indicating means; a resistor connected in series with said meter; and a selenium rectifier connected across said meter and resistor in the diagonal of said bridge circuit, whereby said apparatus is protected from the effect of signals of excessive magnitude.

9. In measuring apparatus of the class described, a Wheatstone bridge circuit which has four arms and two diagonals and which is adapted to be energized by an electric power source connected across one diagonal thereof to actuate indicating means connected across the other diagonal thereof to indicate the condition of balance of said bridge circuit; one of the arms of said bridge circuit including first and second vacuum tubes, each having a filament, an anode, and a control grid; two sources of D. C. power, each connected across the filament of one of said tubes to heat said filaments; circuit means connecting said tubes in series between the terminals forming the ends of said arm of said bridge circuit with the anode of said first tube connected through a grid biasing resistor to the positive side of the D. C. filament power source of said second tube; means connecting the anode of said first tube to the control grid of said second tube; means for impressing the high frequency signal to be measured between the filament and control grid of said first tube; means connecting the negative side of the filament power source of said first tube to one terminal of said arm and the positive side of the diagonally opposite terminal of said bridge circuit to energize said bridge circuit; high frequency filtering means conductively connecting the control electrode circuit of said first tube to its anode; an indicating meter connected across said other diagonal of the bridge; a resistor connected in series with said meter; and a selenium rectifier connected across said meter and resistor, whereby the non-linear resistance characteristic of said rectifier protects the meter against the detrimental effects of large signals.

10. In measuring apparatus of the class described, wherein the desired measurement is made with a Wheatstone bridge circuit which has impedance means forming three arms thereof and which is adapted to be energized by an electric power source connected across one diagonal thereof to actuate indicating means connected across the other diagonal thereof to indicate the condition of balance of said bridge; a fourth arm for said bridge circuit comprising, in combination, first and second vacuum tubes, each having a cathode, an anode, and a control electrode; circuit means connecting said tubes in series between the terminals forming the ends of the fourth arm of said bridge circuit with the anode of said first tube connected to the cathode of said second tube; biasing means interposed in said last-named connection degenerative feedback; means connecting the anode of said first tube to the control electrode of said second tube for limiting the relative output of said first tube; a tunable high frequency resonance circuit connected to the anode and control electrode of said first tube; and selective high frequency pickup means coupled to said resonance circuit to intercept and impress thereon a high frequency signal to be measured, whereby said apparatus may determine accurately the null point of a high frequency field without being detrimentally affected by the maximum field.

ROBERT A. HAMPSHIRE.

REFERENCES CITED

The following references are of record in the file of this patent:

UNITED STATES PATENTS

| Number | Name | Date |
| --- | --- | --- |
| 1,475,749 | Chubb | Nov. 27, 1923 |
| 1,836,934 | Morecroft | Dec. 15, 1931 |
| 1,919,215 | Gunn | July 25, 1933 |
| 2,027,195 | Parkin et al. | Jan. 7, 1936 |
| 2,079,485 | Bousman | May 4, 1937 |
| 2,106,713 | Bowen | Feb. 1, 1938 |
| 2,143,219 | Wenger | Jan. 10, 1939 |
| 2,191,271 | Carter | Feb. 20, 1940 |
| 2,242,874 | Usselman | May 20, 1941 |
| 2,297,543 | Eberhardt | Sept. 29, 1942 |
| 2,302,143 | Pickles | Nov. 17, 1942 |